Figure 1:
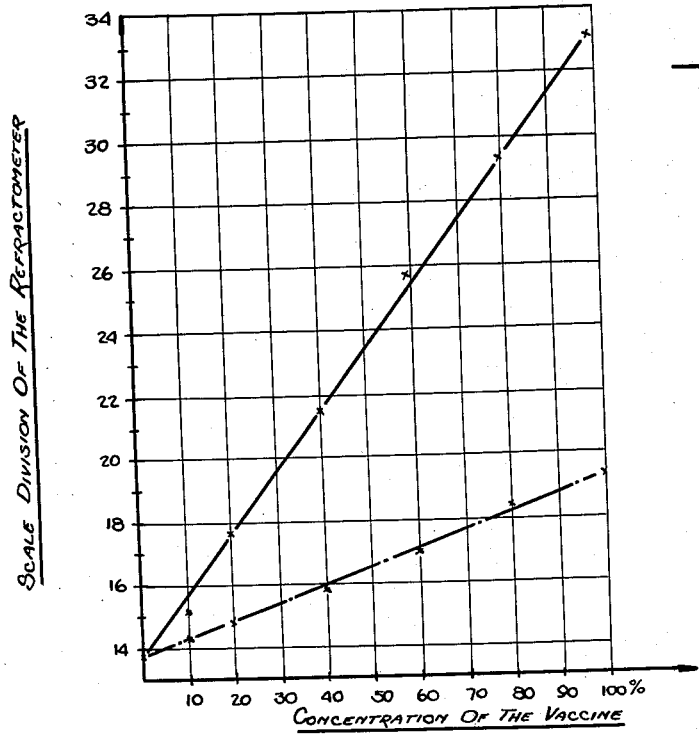

Jan. 7, 1964  A. GRAFE  3,117,061
VIRUS SUSPENSIONS AND THEIR PREPARATION
Filed Nov. 18, 1960  3 Sheets-Sheet 1

INVENTOR.
ALFRED GRAFE
BY
AGENT

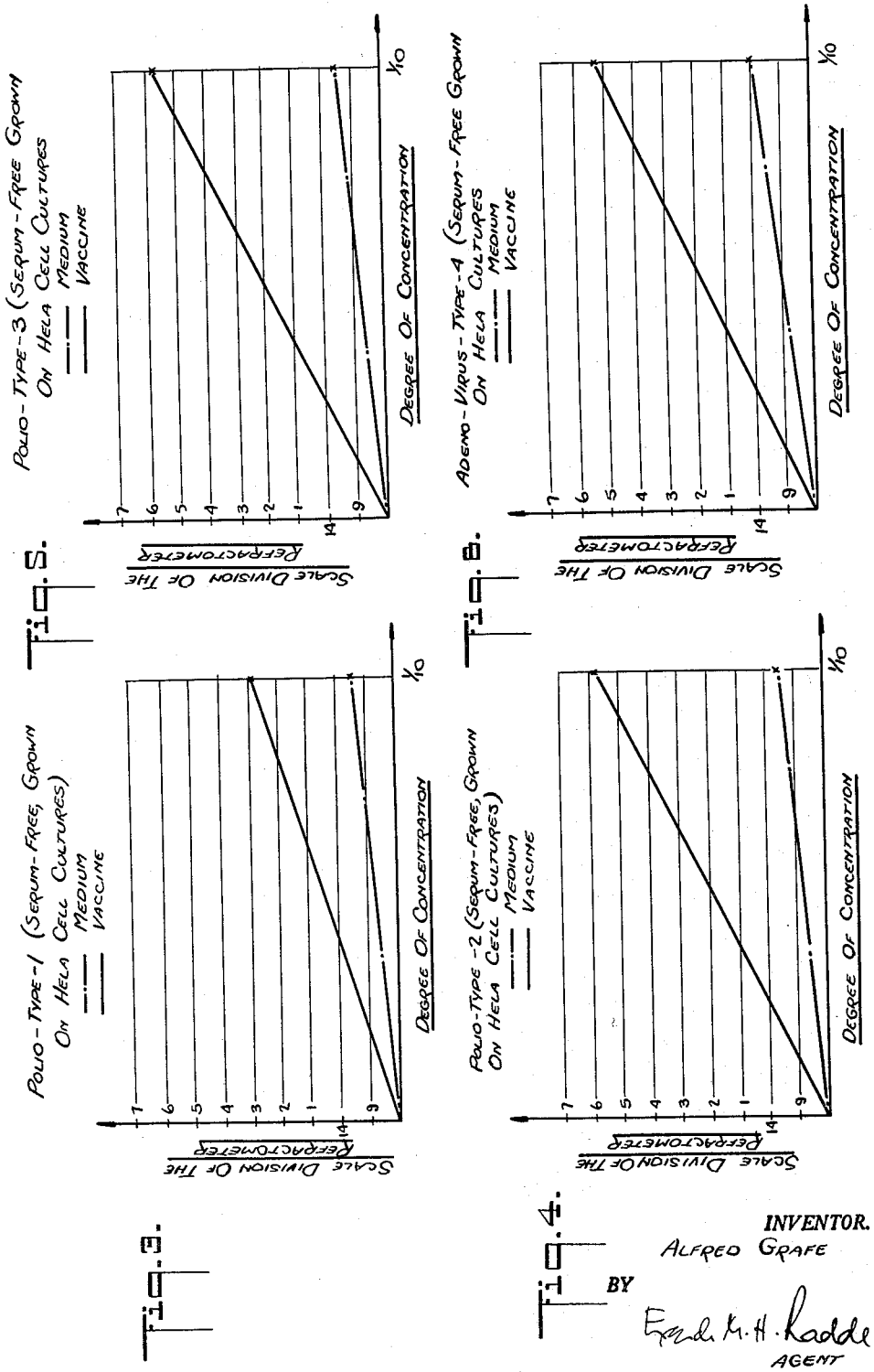

INVENTOR.
ALFRED GRAFE
BY
Friedr. K. H. Raddle
AGENT

United States Patent Office 3,117,061
Patented Jan. 7, 1964

3,117,061
VIRUS SUSPENSIONS AND THEIR PREPARATION
Alfred Grafe, Weinheim an der Bergstrasse, Germany, assignor to C. F. Boehringer & Soehne G.m.b.H., Mannheim-Waldhof, Germany, a corporation of Germany
Filed Nov. 18, 1960, Ser. No. 70,161
Claims priority, application Germany Nov. 21, 1959
5 Claims. (Cl. 167—78)

The present invention relates to virus suspensions or vaccines of a predetermined virus content, to a process of making such suspensions, and to a method of determining the virus content of such vaccines and virus suspensions.

The virus contents of vaccines and virus suspensions, respectively, can successfully be determined only through indirect procedures. All of the indirect determination methods published so far are known to be erratic to a large degree; a deviation to the 10th power is common.

Such conventional indirect methods comprise, for instance, the determination of the infection titer and of the antibody titer. Both of them have to be carried out with living cell material (animal, chicken embryo, or cell culture). When testing inactivated viruses, animal experiments are required, as is well known. The inaccuracies in these determinations average ± one step of the dilution series. Animal experiments are also accompanied by considerable errors which are due to the fact that each animal reacts in a different way. Seasonal influences must also be considered. More recently indirect determination methods have been developed which are based on the so-called hemagglutination effect of certain virus species, for instance, of influenza virus. But even those methods have a rather limited range of application and are quite inaccurate. In this connection it may be pointed out that neither the hemagglutinin titer method nor the infection titer method permit a quantitative determination of the total amount of living and dead viruses present in a virus suspension. Only part of the non-infectious viruses, present in the vaccine or suspension, are determined by the hemaggultinin titer test, and the infection titer test does not determine any of said non-infectious viruses.

The above indicated inaccuracies account for the fact that, heretofore, the preparation of virus vaccines of a "reproducible" and reliable virus content was not possible. Administration of the existing vaccines, therefore, is subject to regulations and controls which in some instances have been imposed upon the pharmaceutical manufacturer by the health authorities. The lack of simple and exact methods of determining the virus content of virus suspensions not only causes difficulties in the therapeutic application of virus vaccines but also considerably complicates the production of useful and effective virus vaccines. Therefore, it is understandable that numerous papers are constantly published, which report on experiments to find a more simple and exact method for the determination of the virus contents of virus vaccines as well as of batches of virus suspensions obtained and to be tested during production of such vaccines.

It is one object of the present invention to provide a simple, accurate, and reliable method of determining the virus content of virus vaccines and suspensions which method is free of the disadvantages and inaccuracies mentioned heretofore.

Another object of the present invention is to provide new and valuable virus vaccines and suspensions of an exactly predetermined virus content which vaccines can reliably and safely be administered to patients.

Still another object of the present invention is to provide a simple and effective process of producing such new and valuable virus vaccines and suspensions of a predetermined virus content.

Other objects of the present invention and advantageous features thereof will become apparent as the description proceeds.

According to the present invention it has been found that simple physical methods and means permit a quantitative determination of the total amount of viruses., i.e. of living and dead, hemagglutinizing and non-hemagglutinizing viruses as they are present in virus vaccines and virus suspensions. This new method consists in a determination of the index of refraction of the virus vaccines or suspensions under certain predetermined conditions. For this purpose, first of all, substantially complete removal of all the ions present in the virus suspension or the vaccine is required. Such removal is preferably effected by dialysis. The resulting colloidal solution is then concentrated to a predetermined volume whereafter the index of refraction is exactly determined.

This method of determining the index of refraction of a substantially ion-free, concentrated virus vaccine or suspension is utilized in the large scale production of vaccines by taking samples at any desired production step and by suitably adjusting the virus content of any charge or vaccine to the desired content. Said new, valuable, and reliable method will be described hereinafter more in detail.

Dialysis may be carried out in conventional dialyzing tubes. The preferred procedure, however, is to use an electrodialyzer, for instance, an electrodialyzer according to Thiele equipped with suitable dialyzing filters, preferably those according to Zsigmondy.

Of course, the type of filter used in this dialyzing step depends on the size of the virus to be tested. Preferably so-called ultra-fine filters are used. Four different ultra-fine filters of different permeability are available and are selected in accordance with the size of the respective virus. The following Table 1 indicates the porosity of said filters:

TABLE 1

| Degree of permeability | Designation | Average pore diameter, μ |
|---|---|---|
| Moderate | m | 35–20 |
| Fine | f | 20–10 |
| Very fine | ff | 10–15 |
| Extremely fine | fff | <5 |

The following membranes are used for the dialysis of various virus species which are phathogenic to humans or animals:

(1) Extremely fine: Foot-and-mouth disease;
(2) Very fine: Poliomyelitis, Coxsackie, ECHO, Theiler's mouse encephalomyelitis, hepatitis;
(3) Fine: encephalitis, Columbia Sk;
(4) Moderate: Adenoviruses, influenza, herpes, vaccinia, variola, polyoma, Rous sarcoma, rabies, Newcastle disease, fowl pest, ektromelia, molluscum contagiosum.

To exclude bacterial contamination, the filter membranes and the plastic parts of the apparatus are treated with a 1–2% formaldehyde solution.

The tests upon which the present invention is based, were carried out in a 100 cc. electrodialyzer. Care must be taken that the apparatus is not charged with a current exceeding 100 ma. for a prolonged period of time. It has proved to be of advantage first to subject the test suspension to dialysis without application of an electric current. Thereby, most of the ions are removed. The removal of the ions and separation of ions and virus particles from each other is then completed by electric current. Said preliminary dialysis without electric current requires between about 14 hours and about 20 hours. It is an important feature of the present invention that the dialyzing water flows uniformly and continuously through the outer dialyzing chambers. Usually 10 l. to 15 l. of distilled water are passed through the apparatus within one hour. The progress of the dialysis is controlled refractometrically. As soon as the difference between the index of refraction of the water passing through the outer chambers and the solution to be tested is less than 40 scale divisions, when using a Zeiss immersion refractometer, electrodialysis is started. Thereby the flow of water is maintained at the same rate of 10 l. to 15 l. per hour. An electric current of 630 volts to 1130 volts is applied to the apparatus whereby all the devices are in parallel connection. Electrodialysis is completed as soon as the refractometric test shows that the difference between the index of refraction of the distilled water and the index of the solution to be tested remains constant for about one hour. Electrodialysis requires ordinarily about five hours.

These preliminary dialysis and electrodialysis steps are followed by concentration of the test suspension. Such concentration results in a considerable increase in the values of the refractometric determinations. Table 2 indicates the results which are obtained when determining the index of refraction of a polio vaccine diluted with various amounts of distilled water before and after concentration by evaporation to one fourth of its original volume.

TABLE 2

| Vaccine in percent | Distilled water in percent | Index of refraction | |
|---|---|---|---|
| | | Before concentration | After concentration |
| 100 | 0 | 19.28 | 33.18 |
| 80 | 20 | 18.32 | 29.37 |
| 60 | 40 | 16.86 | 25.72 |
| 40 | 60 | 15.85 | 21.60 |
| 20 | 80 | 14.87 | 17.79 |
| 10 | 90 | 14.33 | 15.19 |
| 0 | 100 | 13.80 | 13.82 |

It is evident that the indices of refraction in relation to the vaccine concentration increase to a greater extent if the liquids to be tested are concentrated by evaporation before the index of refraction is determined.

The attached FIG. 1 graphically illustrates the remarkable differences in the index of refraction achieved with polio vaccine before concentration and after concentration. Two straight lines are obtained of which the lower line indicates the increase in the index of refraction with increasing virus content of a polio vaccine in non-concentrated form, while the upper, steeper line indicates the increase in the index of refraction determined in the same polio vaccine determined after concentration by evaporation to one fourth of its volume. The ordinate indicates the scale division of the refractometer while the abscissa indicates the concentration of the vaccine. It is evident, for instance, that, at a concentration of 20%, the difference between the lower straight line and the upper straight line is only about 2.9 scale divisions while, at a concentration of about 60%, said difference amounts to 8.9 scale divisions. It is clearly evident that concentration of the vaccine renders the refractometric test method, used according to the present invention, much more sensitive.

Evaporation of the virus suspensions can be carried out in any suitable vacuum evaporator. The preferred device for concentrating the virus suspensions is a rotating vacuum evaporator. The temperature during concentration of the virus suspension must not exceed a temperature of 50° C. (temperature of the water bath) because the viruses are quite temperature sensitive.

When testing a polio virus suspension, it was found that best results are obtained by concentrating such suspensions to one tenth of its original volume. It is, of course, understood that all the liquids to be tested should be concentrated to the same volume. It is one of the essential features of the present invention that substantially all the ions must be removed when concentrating the virus suspension to such an extent. Otherwise the indices of refraction in relation to the vaccine concentration will not produce a straight line. The optimum degree of concentration is surpassed when a precipitation of material is observed during concentration.

The indices of refraction are preferably determined by means of a highly sensitive device. The preferred refractometer which has proved to be especially suitable is the Zeiss immersion refractometer. The determination of the index of refraction is carried out at a constant temperature between 22.5° C. and 24.5° C. The virus suspension and the other liquids to be measured are adjusted to said temperature about one hour before determination is carried out.

The first step of the determination is to adjust the refractometer to a constant value for aqua dest. (in the following examples this value was 13.80). An interval of about 2 minutes should be maintained between each determination in order to allow an equalization of the temperature. It is also recommended to control the index of refraction of the distilled water, for instance, each time after three measurements. To achieve the desired accuracy, each determination is repeated several times, for instance, ten times and the arithmetic mean of the resulting repeated measurements is calculated.

The presence of protein (for instance, from the serum used in growing the tissue cells) interferes with the refractometric measurements. Therefore, the initial virus suspensions must carefully be tested for protein. The highly sensitive sulfosalicylic acid test has proved to be especially suitable for this purpose. It has been found that this sulfosalicylic acid test permits to detect proteins in the virus suspensions to be tested in an amount corresponding to a serum content of 0.04%. It has been found that a fully satisfactory refractometric determination can be carried out if the vaccines or, respectively, the virus suspensions contain less than 0.04% of serum, i.e. if the sulfosalicylic acid test is negative. Ordinarily carefully prepared vaccines do not contain more protein.

It has been found, however, that even if the sulfosalicylic acid test is positive, it is possible to use the refractometric method according to the present invention by correcting the refractometric values in accordance with the protein content of the liquid to be tested. The corrected values are determined as the difference between the index of refraction of distilled water and the index of refraction of a control prepared from the corresponding amount of protein and distilled water. It is, of course, understood that both liquids to be tested must be concentrated by evaporation before the index of refraction is measured. Both liquids are concentrated to about the same volume.

The following Table 3 indicates the protein correction values for protein concentrations between 0.003% and 0.0600%.

TABLE 3

*Protein Correction*

| Protein content in the test liquid, percent | Correction Values | Protein content in the test liquid, percent | Correction Values |
|---|---|---|---|
| 0.0030 | −0.01 | 0.0321 | −0.19 |
| 0.0046 | −0.02 | 0.0338 | −0.20 |
| 0.0062 | −0.03 | 0.0354 | −0.21 |
| 0.0078 | −0.04 | 0.0370 | −0.22 |
| 0.0095 | −0.05 | 0.0387 | −0.23 |
| 0.0111 | −0.06 | 0.0403 | −0.24 |
| 0.0128 | −0.07 | 0.0419 | −0.25 |
| 0.0144 | −0.08 | 0.0436 | −0.26 |
| 0.0160 | −0.09 | 0.0451 | −0.27 |
| 0.0176 | −0.10 | 0.0468 | −0.28 |
| 0.0192 | −0.11 | 0.0484 | −0.29 |
| 0.0208 | −0.12 | 0.0500 | −0.30 |
| 0.0224 | −0.13 | 0.0516 | −0.31 |
| 0.0240 | −0.14 | 0.0533 | −0.32 |
| 0.0256 | −0.15 | 0.0551 | −0.33 |
| 0.0272 | −0.16 | 0.0568 | −0.34 |
| 0.0289 | −0.17 | 0.0584 | −0.35 |
| 0.0305 | −0.18 | 0.0600 | −0.36 |

These correction values are deducted from the difference in the index of refraction of the virus suspension to be tested and the index of refraction of the virus-free culture medium.

Figure 2:
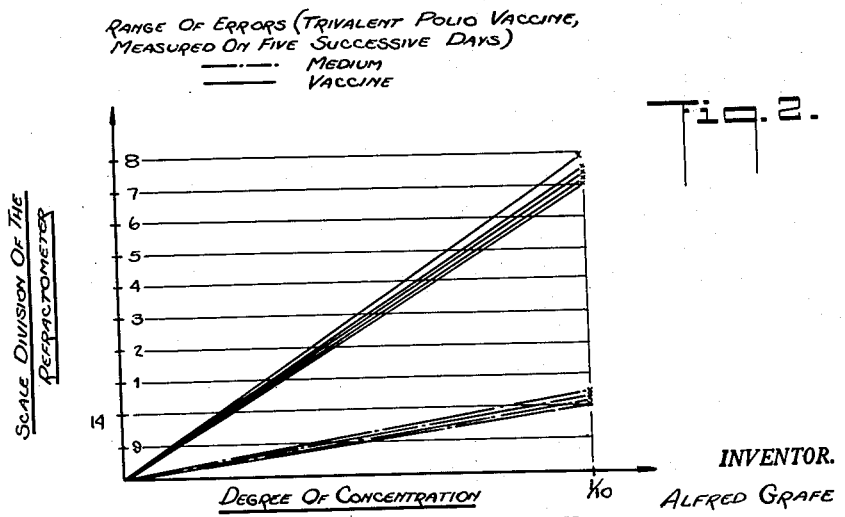

The above described method of determining the indices of refraction permits to make very exact statements regarding the virus contents of a vaccine or a virus suspension. The range of errors is within ±5% as follows clearly from the attached FIG. 2. The straight lines of said FIG. 2 represent the various values of refraction determined in a trivalent polio virus vaccine and the virus-free medium used in making said vaccine. The measurements were carried out on five successive days. It is evident that the range of errors does not exceed ±5%. The polio vaccine as well as the medium were concentrated by evaporation to one tenth of their initial volume. The difference between the indices of refraction of the vaccine (upper line) and the indices of refraction of the medium (lower line) is representative for the virus contents of the vaccines.

The new method according to the present invention of determining the index of refraction of a virus suspension or vaccine can advantageously be employed with good results in the production of vaccines. For instance, if two batches of vaccine of different virus content are obtained, the difference becomes readily evident by determining the indices of refraction of said vaccines. It is, then, possible to mix the two vaccines in a predetermined ratio so as to produce a vaccine of a predetermined index of refraction corresponding to the optimum virus content as ascertained by animal experiments. If the index of refraction of a sample of a virus suspension or vaccine is higher than the predetermined optimum virus content, the respective batch is diluted with the culture medium on which the virus has been grown. If the index of refraction is too low, the respective virus suspension is enriched by adding a more concentrated virus suspension thereto. Application of the method according to the present invention permits to exactly determine the virus contents of any type of virus suspension in the course of the production of a virus vaccine. The method according to the present invention, thus, makes it possible for the first time to prepare vaccines of an always reproducible virus content whereby the time consuming and expensive animal experiments, which heretofore have been used for producing vaccines, can be omitted.

Another possible use of the method according to the present invention is its application to various batches of virus suspensions as obtained in the various production steps. Refractometric determination of said batches readily permits to find out whether a specific production step has been carried out in the desired manner, i.e. whether losses in virus particles have occurred which exceed the admissible amount. In this manner all the production steps can be controlled and any fault in procedure can readily be detected. It is, thus, possible to immediately correct any faulty manipulations within a very short period of time. This is not possible when using the heretofore known methods of determining the virus contents of virus suspensions by animal experiments.

The new method according to the present invention can also be employed with great advantage for carrying out research work in the virus field. It permits, for instance, to investigate the adsorptive power of adsorbing agents and to compare such agents with each other by determining the index of refraction in the supernatant liquid obtained after allowing the absorbing agent to setttle.

The following example serves to illustrate the process according to the present invention without, however, limiting the same thereto.

EXAMPLE

A poliomyelitis vaccine is prepared by cultivating tissue culture inoculated with a virus suspension in the manner well known to the art. The resulting virus suspension is inactivated by a treatment with a dilute aqueous formaldehyde solution, also as known to the art. A sample of said suspension in the amount of 100 cc. is placed into the center chamber of the electrodialyzer according to Thiele. Said center chamber is separated from two outer chambers by means of Zsigmondy filter membranes. 15 l. of distilled water per hour are passed through the outer chambers until the suspension in the center chamber is substantially free of ions. 18 hours are required for this preliminary dialysis step. Thereafter, an electric current is applied to the graphite plates serving as eelctrodes. The graphite plates form the outer walls of the outer chambers of the electrodialyzer. Initially an electric current of between 150 ma. and 200 ma. is applied to the electrodialyzer. Within about thirty minutes the current intensity decreases to 30 ma. to 50 ma. As soon as electrodialysis is completed, the liquid to be measured is concentrated by evaporation to one tenth of its initial volume.

In the preparation of a polio vaccine of the type-2-strain $MEF_1$ measurements were carried out (a) with the virus suspension after inactivation by means of formaldehyde, and (b) with the inactivated virus suspension after its filtration.

The indices of refraction of these virus suspensions were determined after electrodialysis and concentration by evaporation as described hereinabove and the indices of refraction of the culture medium used in growing the virus, i.e. the virus-free culture liquid, were deducted. Furthermore, the protein content of the virus suspensions were determined by the known method of Weichselbaum and the correction values according to Table 3 were also deducted from the resulting difference in the indices of refraction. The values obtained on such determinations will be called hereinafter refractometric units. These refractometric units indicated by "RU" represent the scale division on the refractometer multiplied by 100. It may be mentioned that the preferred virus-free culture liquid used in producing the above mentioned polio vaccine is the "Parker medium 199."

Following there are given the results of measurements obtained with the above mentioned virus suspensions.

(a) Formaldehyde-inactivated virus suspensions after electrodialysis and concentration—

Refractometer values:
- (1) of the virus suspension ............ 15.36
- (2) of the virus-free Parker medium 199 after electrodialysis and concentration ........................ −13.98
  - Difference ........................ 1.38
  - Corresponding to ................. 138 RU
- (3) Protein content of the virus suspension, 0.0302%.
  - Required correction (see Table 3) ............................. −18 RU
- (4) The virus content of the formaldehyde inactivated virus suspension corresponds to ................. 138 RU
  −18 RU
  120 RU (b) Formaldehyde-inactivated and filtered virus suspension—

Refractometric values:
- (1) of the filtered virus suspension .... 14.99
- (2) of the virus-free Parker medium 199 ........................ −14.02
  - Difference ........................ 0.97
  - Corresponding to ................. 97 RU
- (3) Protein content of the virus suspension, 0.0092%.
  - Required correction (see Table 3) ............................. −5 RU
- (4) The virus content of the formaldehyde-inactivated and filtered virus suspension corresponds to ....... 97 RU
  −5 RU
  92 RU Evaluation of the above given results—
(A) Loss of virus by filtration:
- Virus content before filtration (=100% virus) ......................... 120 RU
- Virus content after filtration ......... −92 RU
  28 RU Filtration loss: 23%.

(B) Production of an optimum polio-type-2 vaccine:

It has been found by biological series tests that a polio-type-2 vaccine has its optimum virus content if its refractometric index corresponds to the value of 80±5 RU. It is evident that the above tested polio-type-2 vaccine of a virus content of 92 RU contains 7 RU more than required for its optimum content. Therefore the vaccine is mixed with a polio-type-2 vaccine of 58 RU in the proportion 2:1. The resulting vaccine mixture was tested as described hereinabove and a virus content of 83 RU was found. The mixture thus corresponds to a vaccine of the optimum virus content.

Figure 7:
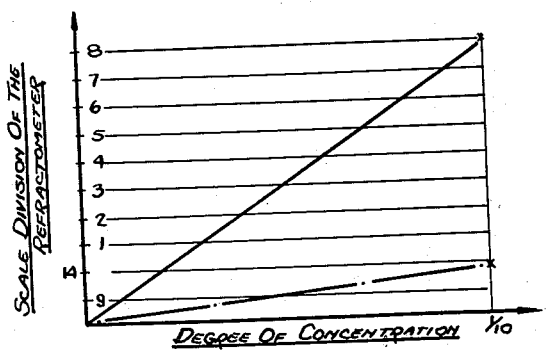
Figure 8:
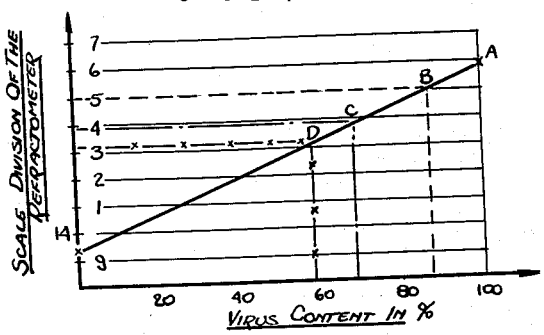

The attached FIGS. 3 to 9 represent other examples of determining the refractometric units of various polio vaccines according to the present invention. In these figures the ordinate indicates the scale divisions measured on the refractometer while the abscissa indicates the degree of concentration. The refractometric units in FIGS. 3 to 7 and 9 were measured after concentration of the vaccines to one tenth of their initial volume. In FIG. 8 the abscissa indicates the virus content in percent.

FIG. 3 illustrates the values of a serum-free polio-type-1 suspension grown on Hela cell cultures. They were obtained by using the method according to the present invention. The difference between the vaccine value (14.29) and the virus-free medium value (13.96) is 0.33 corresponding to 33 RU. The infection titer of the virus suspension (ID 50) was $10^{-6.6250}$ pro cc.

The values of FIG. 4 were obtained by testing the serum-free polio-type-2 virus also grown on Hela cell culture medium. The vaccine value is 14.58 and the virus-free medium value is 13.94. The difference is 0.64 corresponding to 64 RU. The infection titer (ID 50) was $10^{-8.1018}$ pro cc.

FIG. 5 illustrates the values obtained on testing the serum-free polio-type-3 virus grown on Hela cell culture medium. The vaccine value is 14.58, the virus free medium value is 13.95. The difference amounts to 0.63 corresponding to 63 RU. ID $50 = ^{-5.1584}$/cc.

FIG. 6 illustrates the values obtained on testing the serum-free adeno-virus type 4 grown on Hela cell culture medium. The vaccine value is 14.52 and the virus free medium value is 14.00. The difference is 0.52 corresponding to 52 RU. ID $50 = 10^{-3.1004}$/cc.

FIG. 7 illustrates the values obtained on testing a polio vaccine type-1. The sulfosalicylic acid test was negative. The vaccine value is 14.80, the virus free culture value is 13.98. The difference amounts to 0.82 coresponding to 82 RU.

Figure 9:
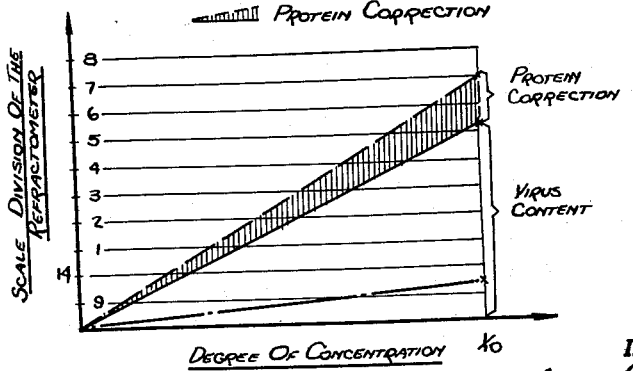

FIG. 9 illustrates the protein correction. For this purpose 0.5% of calf's serum was admixed to a trivalent polio vaccine. The protein content was determined according to Weichselbaum and amounts to 0.0262%. The protein correction according to Table 3 is −0.15 corresponding to 15 RU. The refractometric value of the protein-containing vaccine is 14.69, the value of the culture medium is 13.96. The difference amounts to 0.73 corresponding to 73 RU. 15 RU protein correction are deducted therefrom thus giving a vaccine containing 58 RU.

In FIG. 8 various vaccines are compared with each other. The vaccines were tested as described hereinabove. It was found that the vaccine A had the highest virus content. The differences in refractometric values of the vaccines B, C, and D were plotted. It is readily evident that the vaccine B contained 88%, the vaccine C only 68%, and the vaccine D only 58% of the virus content of vaccine A. This FIG. 8 thus permits, in a very rapid manner to determine the relative virus content of various vaccines. If these vaccines are prepared by different manufacturing methods from the same tissue cultures the method permits to evaluate the usefulness of and the differences in said manufacturing processes.

The method according to the present invention is, of course, applicable to any type of vaccine as has been pointed out hereinabove. Many changes and variations in the methods of preparing the starting virus suspensions, of concentrating, dialyzing, and electrodialyzing the same, of the apparatus used in such concentration, dialysis, and electrodialysis as well as in determining the refractometric values and the like may be made by those skilled in the art in accordance with the principles set forth herein and in the claims annexed hereto.

I claim:
1. In a process for the preparation of virus suspensions of predetermined concentration by the treatment of substantially protein-free virus suspensions which have been subjected to dialysis against distilled water to substantially completely remove the ions present therein, the steps of concentrating by evaporation said substantially protein and ion-free virus suspension having normally no measurable index of refraction corresponding to concentration without causing formation of a precipitate until said virus suspension demonstrates a measurable index of refraction directly proportional to virus concentration, measuring the index of refraction of said concentrated virus suspension, determining the concentration of virus in said virus suspension by comparing its index of refraction with the index of refraction of at least one virus suspension corresponding to a known virus concentration and adjusting the concentration of virus in said virus suspension so as to produce a suspension having a known index of refraction corresponding to the desired virus concentration.

2. In a process for the preparation of virus suspensions of predetermined concentration by treatment of substantially protein-free virus suspensions which have been subjected to dialysis against distilled water to substantially completely remove the ions present therein, the steps of concentrating by evaporation at a temperature which does not exceed 50° C., said substantially protein and ion-free virus suspension having normally no measurable index of refraction corresponding to concentration without causing formation of a precipitate until said virus suspension demonstrates a measurable index of refraction directly proportional to virus concentration, measuring the index of refraction of said concentrated virus suspension at a temperature between 22.5° C. and 24.5° C., determining the concentration of virus in the said virus suspension by comparing its index of refraction with the index of refraction of at least one virus suspension corresponding to a known concentration and adjusting the concentration of said virus suspension by treating the virus suspension to provide therefor a refractive index identifiable with a virus suspension of known desired concentration.

3. In a process for the determination of a concentration of virus suspensions by treatment of substantially protein-free virus suspensions which have been subjected to dialysis against distilled water to substantially completely remove the ions present therein, the steps of concentrating by evaporation said substantially protein and ion-free virus suspension having normally no measurable index of refraction corresponding to concentration without causing formation of a precipitate until said virus suspension demonstrates a measurable index of refraction directly proportional to virus concentration, measuring the index of refraction of said concentrated virus suspension and determining the concentration of virus in the said virus suspension by comparing its index of refraction with the index of refraction of at least one virus suspension corresponding to a known virus concentration.

4. In a process for the determination of a concentration of virus suspensions by treatment of substantially protein-free virus suspensions which have been subjected to dialysis against distilled water to substantially completely remove the ions present therein, the steps of concentrating by evaporation at a temperature which does not exceed 50° C. without causing formation of a precipitate, the virus suspension having normally no measurable index of refraction corresponding to concentration until said virus suspension demonstrates a measurable index of refraction directly proportional to virus concentration, measuring the index of refraction of said concentrated virus suspension at a temperature between 22.5° C. and 24.5° C., and determining the concentration of virus in the said virus suspension by comparing its index of refraction with the index of refraction of at least one virus suspension corresponding to a known virus concentration.

5. In the determination of the concentration of virus suspensions the steps of concentrating by evaporation a substantially protein and ion-free virus suspension having normally no measurable index of refraction corresponding to concentration until said virus suspension demonstrates a measurable index of refraction directly proportional to virus concentration, measuring the index of refraction of said concentrated virus suspension, and determining the concentration of virus in the said virus suspension by comparing its index of refraction with the index of refraction of at least one virus suspension of known virus concentration.

References Cited in the file of this patent

FOREIGN PATENTS 236,535    Great Britain _____ Apr. 22, 1926

OTHER REFERENCES

Kabat, Experimental Immunochemistry, pp. 351–352; pub. 1948 by Charles C. Thomas, Springfield, Ill.

Polson et al.: Biochemica and Biophysica Acta, 1957, vol. 24, pp. 600–603.

Schaffer et al.: Advances in Virus Research, 1959, pp. 159–165, 176.